Patented Apr. 2, 1940

2,195,463

UNITED STATES PATENT OFFICE 2,195,463

COMPOUNDS OF THE ANTHRAQUINONE SERIES

Artur Krause, Ludwigshafen - on - the - Rhine, Walther Kuehne, Mannheim, and Walter Mieg, Opladen, Germany, assignors to General Aniline & Film Corporation, a corporation of Delaware No Drawing. Application November 19, 1938, Serial No. 241,396. In Germany December 23, 1936

9 Claims. (Cl. 260—261)

The present invention relates to compounds of the anthrone series containing in the 1.9-position a six-membered ring and a process of producing them.

This application is a continuation-in-part of our copending application Ser. No. 180,612, filed December 18, 1937.

We have found that valuable new compounds of the anthrone series are obtained by causing phosphorus halides to act on amino compounds of the anthrone series containing in the 1.9-position a six-membered ring and having at least one exchangeable hydrogen atom attached to nitrogen and treating the resulting compounds with alkaline agents.

The amino compounds serving as initial materials may contain one or more amino groups at any position of the molecule. The amino groups may also be attached to the anthrone containing in the 1.9-position a six-membered ring by atomic bridges. As initial materials may be mentioned aminobenzanthrones, amino-1.9-azabenzanthrones, amino-1.9-pyridinoanthrones, amino-1.9-pyridonoanthrones, amino-1.9-pyrimidinoanthrones, amino - 1.9 - pyrimidonoanthrones, amino-1.9-pyridazinoanthrones or amino-1.9-pyridazonoanthrones. Among phosphorus halides there may be mentioned phosphorus trichloride, phosphorus pentachloride, phosphorus oxychloride as well as the corresponding bromine and iodine compounds. Generally speaking phosphorus oxychloride proves to be the most suitable.

The reaction is preferably carried out below room temperature and in an organic diluent in the presence of an additional substance capable of binding acids. For the latter purpose there may be mentioned for example ammonia or organic bases, such as pyridine, quinoline or dimethylaniline. The said substances may also serve simultaneously as solvents.

The substances thus first formed still contain halogen. They are converted into compounds free from halogen by treatment with alkaline agents, such as caustic alkalies, alkali carbonates or bases such as piperidine. The resulting compounds are most probably phosphamic acids. They are usually colored, readily soluble in water and can either be used as dyestuffs or for the preparation of dyestuffs. It is of special importance that they are soluble in water and usually dye acetate artificial silk, wool and viscous artificial silk very fast shades.

The following examples will further illustrate how the said invention may be carried out in practice but the invention is not restricted to these examples. The parts are by weight.

Example 1

50 parts of phosphorus oxychloride are added while vigorously stirring to a suspension of 25 parts of finely ground 4-amino-1.9-pyrimidinoanthrone in 500 parts of dry pyridine. The whole is heated at from 40 to 50° C. while stirring, until a sample has become entirely soluble in 3 per cent caustic soda solution. Then the mixture is poured into 2500 parts of 5 per cent caustic soda solution and the pyridine removed by means of steam. After cooling the aqueous solution is acidified with hydrochloric acid, the resulting precipitate is filtered off by suction, washed and triturated with a small amount of caustic soda solution, until it has turned slightly alkaline, and dried. The dyestuff thus obtained is soluble in water giving a yellow-brown coloration and dyes acetate artificial silk, wool or silk greenish yellow, very fast shades from a neutral or slightly acid bath.

Example 2

A mixture of 25 parts of 8-amino-1.9-anthrapyrimidinoanthrone and 500 parts of dry pyridine is stirred vigorously at room temperature and 50 parts of phosphorus oxychloride are allowed to drop in. After stirring the mixture for several hours at 25° C. until a sample has become entirely soluble in 3 per cent caustic soda solution, the mixture is poured into 2500 parts of 5 per cent caustic soda solution and the pyridine removed by means of steam. After cooling the aqueous solution is acidified with hydrochloric acid, the resulting precipitate is filtered off by suction, washed and triturated with a small amount of caustic soda solution, until it has turned slightly alkaline, and dried. The dyestuff thus obtained is easily soluble in water giving a red coloration; it dyes wool, silk, artificial silks, such as acetate artificial silk or viscose, or mixtures of these materials red shades from a neutral or slightly acid bath.

In a similar manner from 2-amino-1.9-pyrimidinoanthrone there is obtained a golden-yellow dyestuff, from 5-amino-1.9-pyrimidinoanthrone a bluish red dyestuff.

Example 3

50 parts of phosphorus oxychloride are allowed to drop into a suspension of 25 parts of Bz1-aminobenzanthrone in 500 parts of dry pyridine while stirring. As soon as a sample has become soluble in 3 per cent caustic soda solution, the mixture is poured into 5 per cent caustic soda solution and the pyridine is removed with steam. After cooling the red solution is acidified, the separated substance is filtered off by suction and washed with water. The resulting compound is reconverted into its stable alkali salt by the addition of such amounts of caustic soda solution until it has become weakly alkaline. The dyestuff thus obtained is readily soluble in water giving a brown-red solution and dyes wool or acetate artificial silk scarlet-red shades.

In the same way with Bz2-aminobenzanthrone and 8-aminobenzanthrone respectively there are obtained final products which are soluble in aqueous alkaline solutions giving from yellow to reddish yellow colorations.

What we claim is:

1. A process of producing compounds of an anthrone which comprises acting on an amino compound of an anthrone containing in the 1.9-position a six-membered ring with a phosphorus halide and treating the resulting compounds with alkaline agents.

2. A process of producing compounds of an anthrone which comprises acting on an amino compound of an anthrone containing in the 1.9-position a six-membered ring with phosphorus oxychloride and treating the resulting compounds with alkaline agents.

3. A process of producing compounds of an anthrone which comprises acting on an amino compound of an anthrone containing in the 1.9-position a six-membered ring with a phosphorus halide in the presence of a substance capable of binding acids and treating the resulting compounds with alkaline agents.

4. A process of producing compounds of an anthrone which comprises acting on an amino compound of an anthrone containing in the 1.9-position a six-membered ring with a phosphorus halide at a temperature below room temperature and treating the resulting compounds with alkaline agents.

5. An anthrone of the general formula:

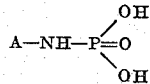

wherein A is the radical of an anthrone containing in the 1.9-position a six-membered ring.

6. An anthrone containing in the 1.9-position a six-membered ring and containing in an alpha-position the group

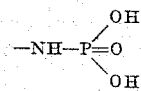

7. The anthrone of the formula

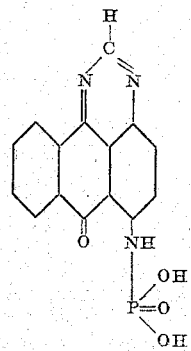

8. The anthrone of the formula

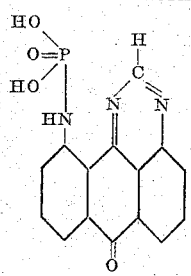

9. The anthrone of the formula

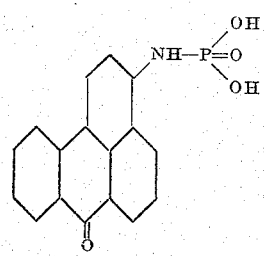

ARTUR KRAUSE.
WALTHER KUEHNE.
WALTER MIEG.